(12) United States Patent
You (10) Patent No.: US 7,146,877 B2
(45) Date of Patent: Dec. 12, 2006

(54) HANDLEBAR SHOCK ABSORBING SYSTEM FOR BICYCLES

(75) Inventor: Yen-Jen You, 7671 Malahat Avenue, Richmond, British Columbia (CA) V7A 4H1

(73) Assignee: Yen-Jen You, Richmond (CA)

( * ) Notice: Subject to any disclaimer, the term of this patent is extended or adjusted under 35 U.S.C. 154(b) by 121 days.

(21) Appl. No.: 11/099,307

(22) Filed: Apr. 6, 2005

(65) Prior Publication Data
US 2006/0130606 A1   Jun. 22, 2006

(51) Int. Cl.
*B62K 21/20* (2006.01)
(52) U.S. Cl. .................................... 74/551.2
(58) Field of Classification Search .... 74/551.1–551.9; 267/154, 155, 275, 284; 280/283; 114/144 R
See application file for complete search history.

(56) References Cited

U.S. PATENT DOCUMENTS

| | | | |
|---|---|---|---|
| 3,941,011 A * | 3/1976 | Kirk ........................... 74/551.2 |
| 5,186,074 A * | 2/1993 | Arnold ....................... 74/551.2 |
| 5,220,851 A * | 6/1993 | Flechel ...................... 74/551.2 |
| 5,405,159 A * | 4/1995 | Klein et al. ................. 280/283 |
| 5,441,291 A * | 8/1995 | Girvin, III .................. 280/276 |
| 5,509,676 A * | 4/1996 | Fukutake et al. ........... 280/276 |
| 5,511,444 A * | 4/1996 | Clausen et al. ............ 74/551.2 |
| 5,586,780 A * | 12/1996 | Klein et al. ................. 280/275 |
| 5,622,132 A * | 4/1997 | Mardikian ............. 114/144 R |
| 5,678,457 A * | 10/1997 | Hals ......................... 74/551.3 |
| 6,332,625 B1 * | 12/2001 | Fukunaga et al. .......... 280/280 |

* cited by examiner

*Primary Examiner*—Chong H. Kim (57) ABSTRACT

A handlebar shock absorbing system for bicycles, utilizing a pair of side plates attached to a handlebar mounting bracket with rotational movement of a handlebar against a torsional spring. Where the handlebar can be adjustable for torsional spring force and/or for rotational travel and positioning of handlebar grips, either forward tilting, level or rearward tilting.

6 Claims, 12 Drawing Sheets

HANDLEBAR SHOCK ABSORBING SYSTEM FOR BICYCLES

FIELD OF THE INVENTION

The invention relates to a bicycle handlebar mounting system, and more specifically to a variably adjustable shock-absorbing handlebar mounting system utilizes an adjustable torsional spring force.

BACKGROUND OF THE INVENTION

In order to reduce shock and help prevent injuries, currently the bicycle industry has been providing a number of solutions, such as springs or liquid type shock-absorber within the front fork, springs installed under the seat, shock-absorber and springs installed under the upper frame tube. Although, the above solutions do achieve some shock-absorbing effect, cyclists still suffer injuries.

When shock occurs on an uneven road, the cyclist generally grips more firmly which can increase the likelihood of some injuries. The fixed link between the handlebar and the handlebar stem seems to be one of the main causes of certain injuries. By making the present invention much more adjustable for various types of cycling and a wide range of cyclists' desires, the present invention will be more likely to take hold in the market place thereby becoming more available to consumers and thereby reducing certain injuries causes that the industry seems to continue to overlook.

Various types of shock-absorbing handlebar mounting systems are already known. Some of these are listed below;

Inventors are aware of U.S. Pat. No. 367,368 issued to J. S. Copeland Aug. 2, 1887, entitled "Velocipede". Inventors are also aware of U.S. Pat. No. 626,602 issued to J. T. Fenton, et al. on Jun. 6, 1899, entitled "Bicycle Handle Bar". Inventors are also aware of U.S. Pat. No. 5,181,436 issued to Lai on Jan. 26, 1993 entitled "Stem for interconnecting a handlebar and a head tube of a bicycle". Inventors are also aware of U.S. Pat. No. 5,660,406 issued to Menze, sen. on Aug. 26, 1997, entitled "Sprung steering system front structure for bicycles". Inventors are also aware of U.S. Pat. No. 5,887,490 issued to Dittmar on Mar. 30, 1999, entitled "Adjustable handlebar stem using a locking pin system".

The above patents, although useful, do not cover the specific application and process of the present invention. Bicycles are a multiple-purpose vehicle for transportation, sports, and recreational activities and consumers and thus bicycle manufacturers don't readily progress to certain improvements, unless these improvements are more variably adaptable.

SUMMARY OF THE INVENTION

It is therefore an object of the present invention to minimized handlebar shock and to improve the cyclist's biking comfort.

Another object of the present invention is to allow flexible choices of spring force, based on the cyclist's riding habit and the length of handlebar grips, the spring force can be adjusted to his or her preference.

It is also an object of the present invention to allow various choices of the pull-up/push-down range of the handlebar grips, so cyclist can adjust the grips' pull-up/push-down range he or she enjoys most, for both forward and backward tilting handlebar grips It is yet another object of the present invention to minimized cyclist's potential injury related to ridged handlebars.

The present invention mainly includes a handlebar, one pair of handlebar grips, one handlebar bracket. The handlebar bracket is installed to a standard bicycle handlebar stem using a split mounting block. The handlebar bracket connects the handlebar through a hole in each of two opposing mounting plates. The handlebar is mounted in this way to allow it to rotate within the holes on the two opposing mounting plates.

A torsion spring fits between the two opposing mounting plates and the handlebar slides through the spring. A torsion bracket is mounted on the handlebar in-between the torsion spring coils. The spring coils have an adjoining end fixed to the end of the torsion bracket and the spring has two other ends fixed firmly to spring positioning bolts. The spring positioning bolts are fixed into open slots on the opposing mounting plates of the handlebar stem bracket.

There are a number of opposing slots around each side plate for the adjustment of the spring positioning bolts. The spring poisoning bolts can be fixed in a different pair of slots depending on the desired spring tension.

The opposing side plates include two limiting bolts for contact of the torsion bracket. The top bolt limits the upward travel of the handlebar and a lower bolt limits the lower extent of the handlebar travel. The lower limiting bolt has an opposing slot, one on each side of the opposing side plates. The lower slot allows the adjustment of the allowable downward travel of the handlebar.

The handlebar mounting bracket and its two opposing side plates can be reversed on the bicycle handlebar stem for functioning when using a forward tilting handlebar.

The substantially perpendicular handlebar grips are installed at certain angles on the handlebar and can be positioned at any angle as the cyclist may desire, from level, to up or down, or a forward tilting angle, to increase cyclist's comfort. As well the rotation of the handlebar against the torsion spring will absorb much of the bicycle's shock to minimize the negative impact to a cyclist's wrists, elbows, shoulders and body.

In one aspect the present invention may be characterized as a handlebar shock absorber which includes a handlebar pivotally mounted to a mounting bracket for rotation of the handlebar between a rest position and a depressed position, where the mounting bracket is rigidly mountable to the upper end of a handlebar stem so that an axis of rotation of the handlebar is substantially co-axial with a longitudinal axis of the handlebar. Thus, rotation of the handlebar rotates the handlebar about the longitudinal axis. A resilient biasing means is mounted to, so as to cooperate between, the handlebar and the mounting bracket. The resilient biasing means resiliently biases the handlebar into the rest position and resiliently urges the handlebar to return to the rest position when the handlebar is rotated towards the depressed position.

Advantageously the resilient biasing means is a spring having first and second opposite ends, where the first end of the spring is rigidly mounted to the handlebar, the second end of the spring is rigidly mounted to the mounting bracket. In a preferred embodiment, the second end of the spring is adjustably mountable to the mounting bracket. That is, the mounting bracket is adapted to receive the second end adjustably mounted thereto, along a range of selectively mountable mounting locations on the mounting bracket between a first mounting location wherein the spring is at a lower pre-tension and a second mounting location wherein the spring is at a higher pre-tension when the handlebar is in the rest position. Thus, spring resistance to rotation of the handlebar is selectively adjusted by mounting of the second end of the spring between the first and second mounting locations.

As better described below, the spring may be a helical coil spring and the handlebar may be journalled through the coil. Further, the mounting locations on the mounting bracket may be a radially spaced apart array of mounting locations radially spaced apart about the axis of rotation of the handlebar and the mounting bracket may include a U-shaped member in which case the spring may be mounted sandwiched within the U-shaped member. A base of the U-shaped member may be mountable to the handlebar stem and a pair of arms of the U-shaped member may extend from the base sandwiching the spring therebetween. The array of mounting locations may be formed in at least one of the arms of the pair of arms, and may lie in a substantially vertical plane. The array of mounting locations may be an array of radially extending slots, for example an array of radially extending open ended slots each opening outwardly of the mounting bracket.

In one embodiment a lever arm may be rigidly mounted to the handlebar. The first end of the spring may be mounted to a distal end of the lever arm, distal from the handlebar. Upper and lower travel stops may be mounted to the mounting bracket so that the distal end of the lever arm is limited to translate in rotation about the axis of rotation between the travel stops. At least one of the travel stops may be selectively adjustable to vary a travel range of motion of the distal end of the lever arm between the travel stops.

BRIEF DESCRIPTION OF THE DRAWINGS

Advantages of the present invention will become more fully appreciated as the same becomes better understood when considered in conjunction with the following detailed description of an illustrative embodiment and accompanying drawings, in which like reference characters designate the same or similar parts throughout the several views, and wherein.

DETAILED DESCRIPTION OF EMBODIMENTS OF THE INVENTION

Figure 1:
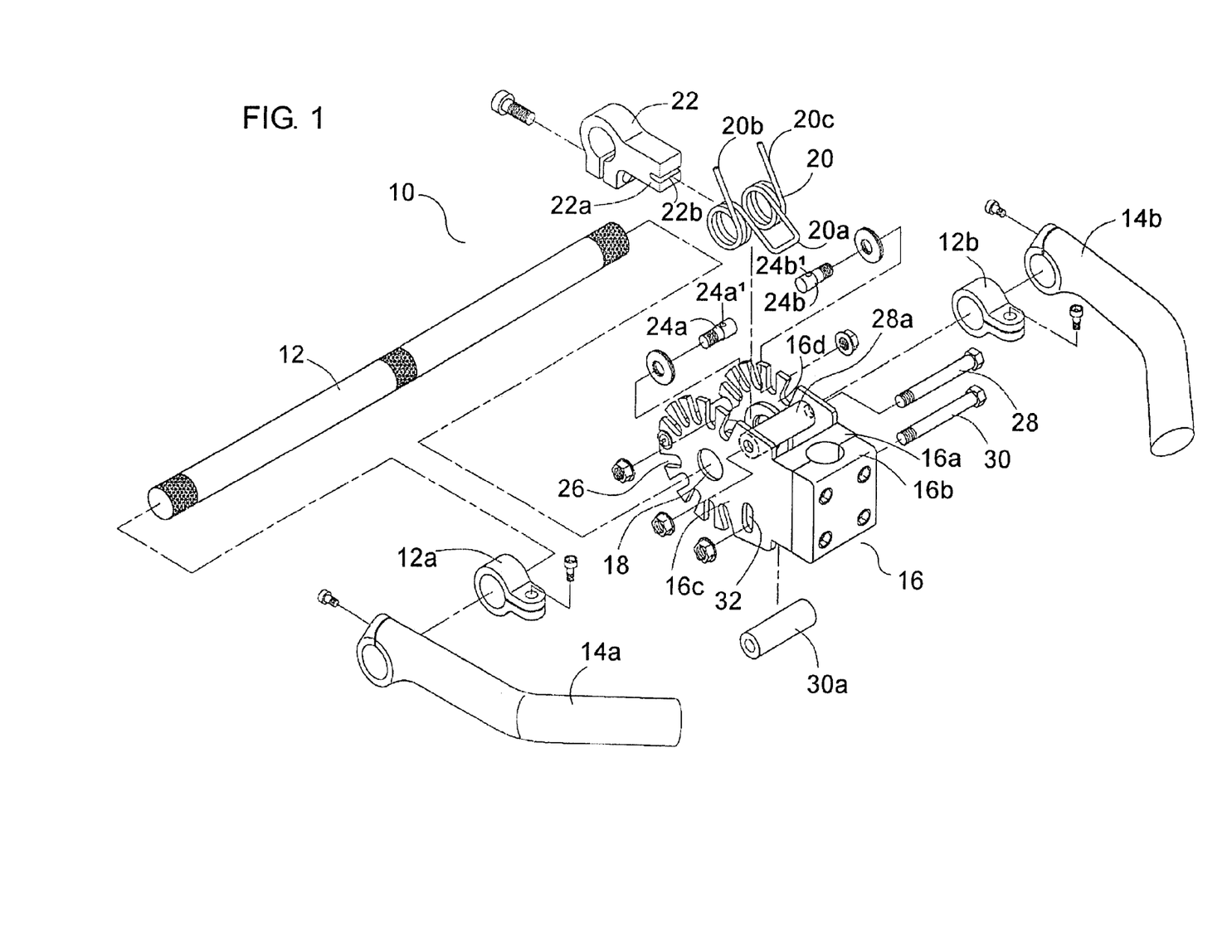
FIG. 1 is a perspective exploded view of the preferred embodiment showing each component of the invention.

The handlebar shock-absorbing system is generally referred to as 10. As shown in FIG. 1 in exploded schematic view, one embodiment of the handlebar shock-absorbing system 10 includes a handlebar 12, a pair of handlebar grips 14a and 14b, and a handlebar stem mounting bracket 16. The handlebar mounting bracket 16 has a split mounting block 16a and 16b so as to be easily mounted onto a handlebar stem.

Handlebar 12 is pivotally or rotatably mounted to handlebar mounting bracket 16 through apertures 18, one in each of two opposing parallel mounting plates 16c and 16d extending forwardly from handlebar mounting bracket 16. Torsion spring 20 is mounted between opposing mounting plates 16a and 16b. In embodiments where torsion spring 20 is a helical coil spring, the spring is aligned and sized so as to slide over handlebar 12 when handlebar 12 is mounted through apertures 18. Cross-member 17 is mounted between the distal ends of mounting plates 16c and 16d.

Figure 4:
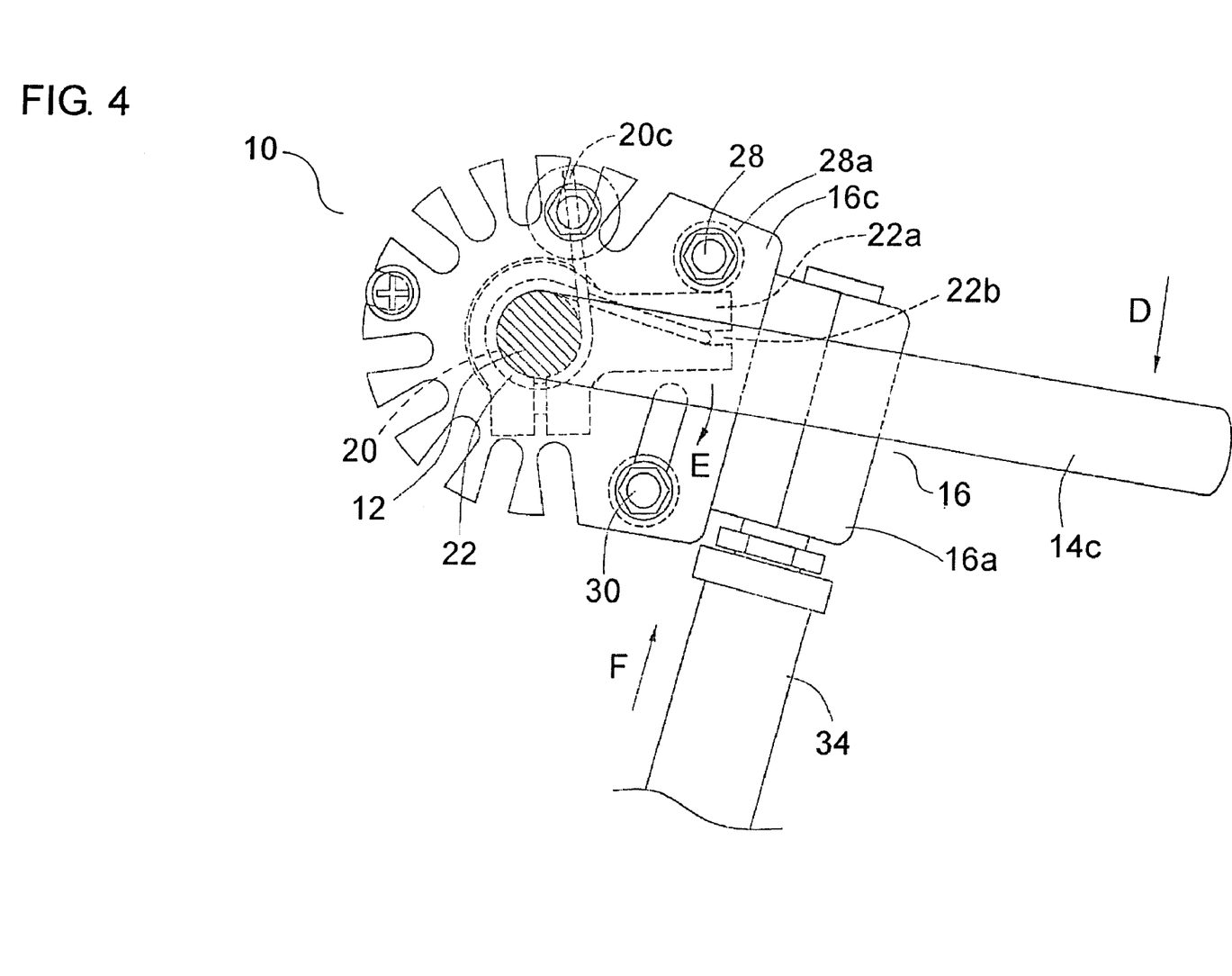
FIG. 4 is a partial sectional view of the view of FIG. 3 showing the downwards rotation of the handlebar from a substantially level, rearward lowered position.
Figure 5:
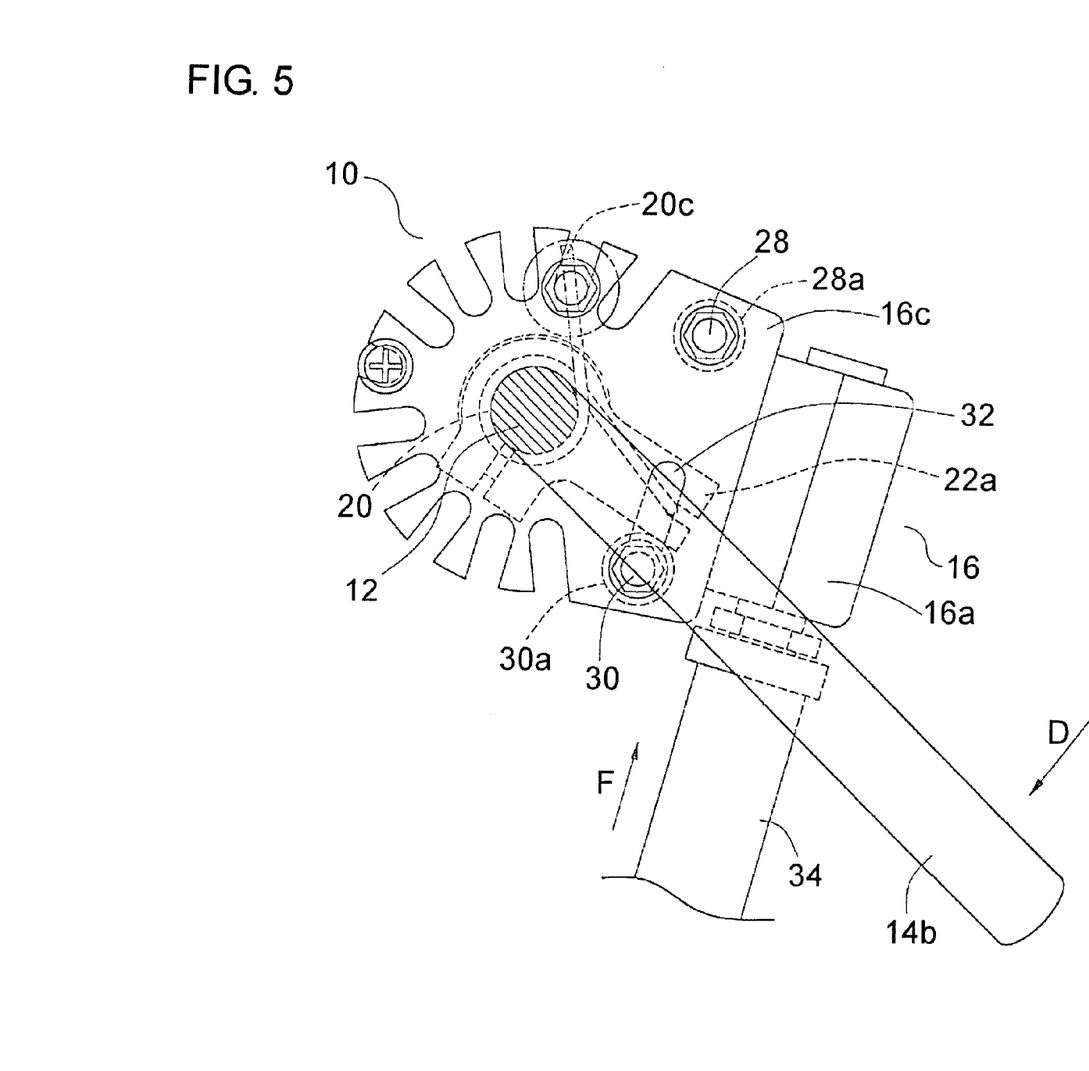
FIG. 5 is the sectional view of FIG. 4 showing the downwards rotation of the handlebar against the return biasing force of the torsion spring.
Figure 6:
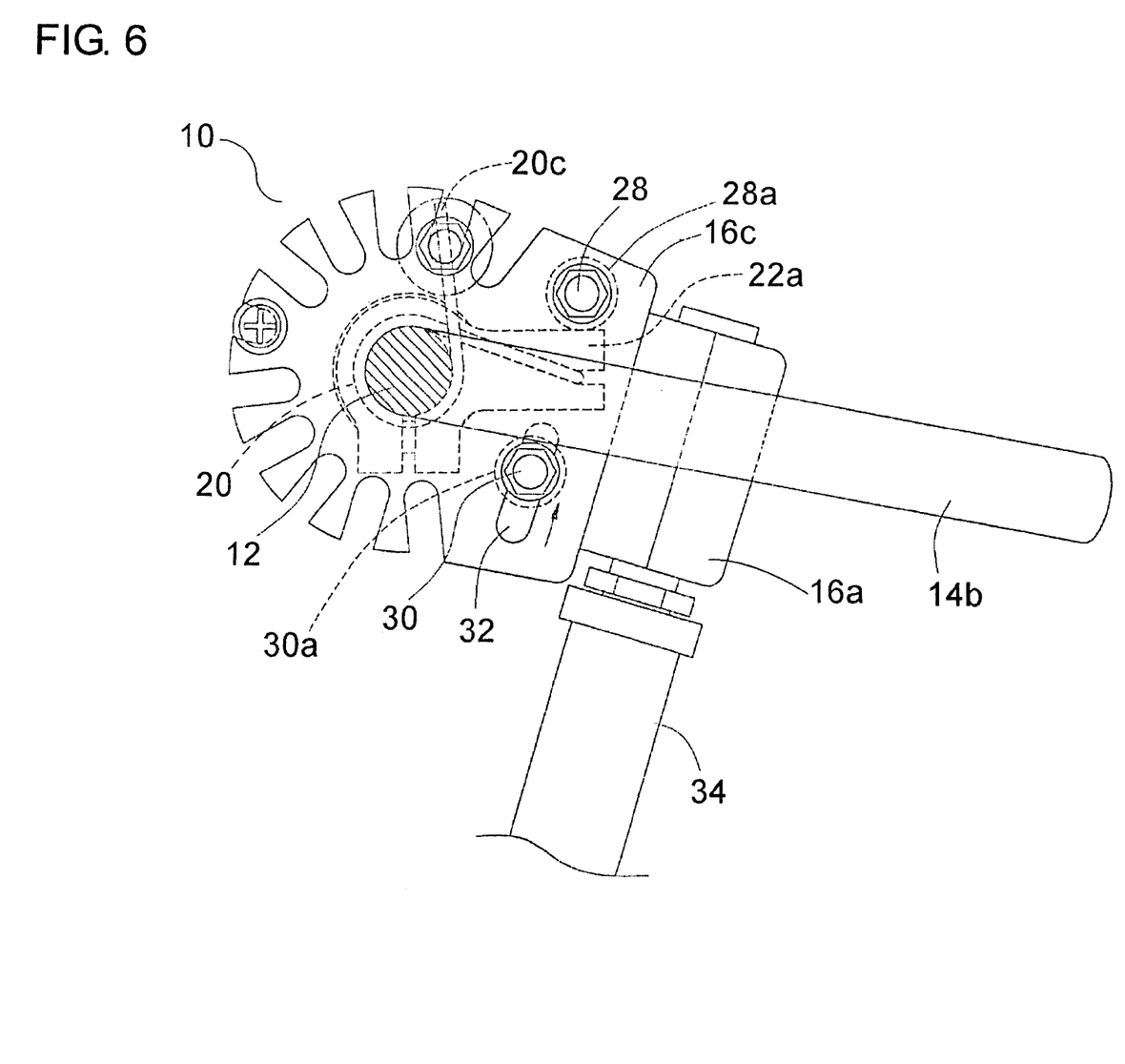
FIG. 6 is the sectional view of FIG. 4 showing an adjustment to limit the lower rotational range of the handlebar by the raising of the lower limiting bolt.

A handlebar torsion bracket 22 is rigidly mounted on handlebar 12, for example as illustrated set within torsion spring 20 so as to be sandwiched between ends 20b and 20c and corresponding helical segments of spring 20. Handlebar torsion bracket 22 includes an adjoining end 22a cantilevered from the body of bracket 22. An end 20a of spring 20 opposite to ends 20b and 20c is mounted into a slot 22b in the distal end of torsion bracket end 22a. Thus spring end 20a is rigidly anchored to handlebar 12 so that spring end 20a rotates as handlebar 12 is rotated about axis of rotation 13. Spring ends 20b and 20c mount to spring positioning bolts 24a and 24b by journaling of ends 20b and 20c through apertures 24a' and 24b' respectively. Spring positioning bolts 24a and 24b are selectively mounted into one opposing pair of slots 26 in the radially spaced array of open slots 26 on side plates 16c and 16d radially spaced about axis B. With spring ends 20b and 20c, mounted into apertures 24a' and 24b' in spring positioning bolts 24a and 24b, spring positioning bolts 24a and 24b may be slotted into any opposing pair of slots 26 to adjust desired spring tension of spring 20. Thus as seen in FIGS. 4–6, spring ends 20b and 20c may be mounted adjacent the second slot 26 (counted counterclockwise in FIG. 4) to provide a lower spring resistance to downward depression of the handle, or may as seen by way of example be mounted adjacent in slots 26 which increase the pre-tensioning of spring 26, for example the fourth slot 26 as seen in FIG. 7b. This increases the spring resistance to downward force D on grips exerted by a rider riding in rough terrain results in rotation E of bracket 22 and handlebar 12 about axis of rotation 13 against the return biasing force of spring 20. For example an upward jolt in direction F would cause downward depression of grips 14a and 14b.

An upper limiting bolt 28 and a lower limiting bolt 30 are mounted vertically spaced apart in side plates 16c and 16d. Upper limiting bolt 28 and lower limiting bolt 30 contact handlebar torsion bracket 22. Top limiting bolt 28, limits the upward rotational travel of end 22a of bracket 22 and thus limits the rotation of handlebar 12 about axis 13. Lower limiting bolt 30 limits the lower rotational travel of end 22a and thus also limited the rotation of handlebar 12. Side plates 16c and 16d each have an adjustment slot 32. Lower limiting bolt 30 is mounted through the pair of adjustment slots 32. Lower limiting bolt 30 within the pair of adjustment slots 32 provides adjustment of the allowable downward rotational travel of the handlebar 12. Contact sleeves 28a and 30a are mounted on limiting bolts 28 and 30, where end 22a of torsion bracket 22 makes rotational contact with the bolts.

In the embodiment of FIG. 1, handlebar grips 14a and 14b are releasably and lockably adjustable at desired angles, in a range from level, to vertically up or down, or in between at a forward tilting angle. Stop clamps 12a and 12b mounted on handlebar 12 take-up lateral force of handlebar 12 bearing against handlebar side plates 16c and 16d.

Figure 2:
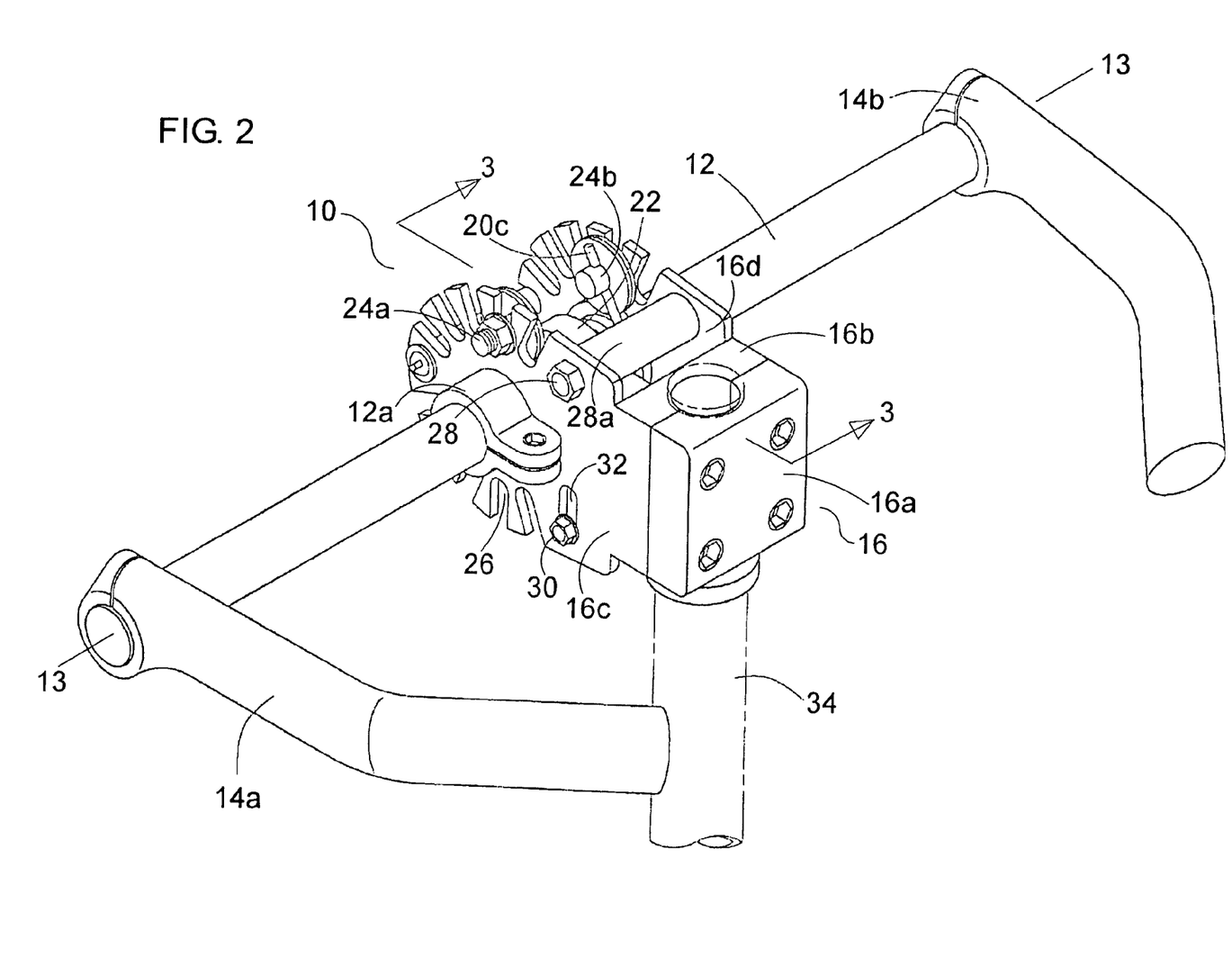
FIG. 2 is a perspective view of the invention.

The handlebar shock-absorbing system 10 is shown assembled in a schematic view in FIG. 2 where handlebar bracket 16 is installed onto a standard bicycle handlebar stem 34.

Figure 3:
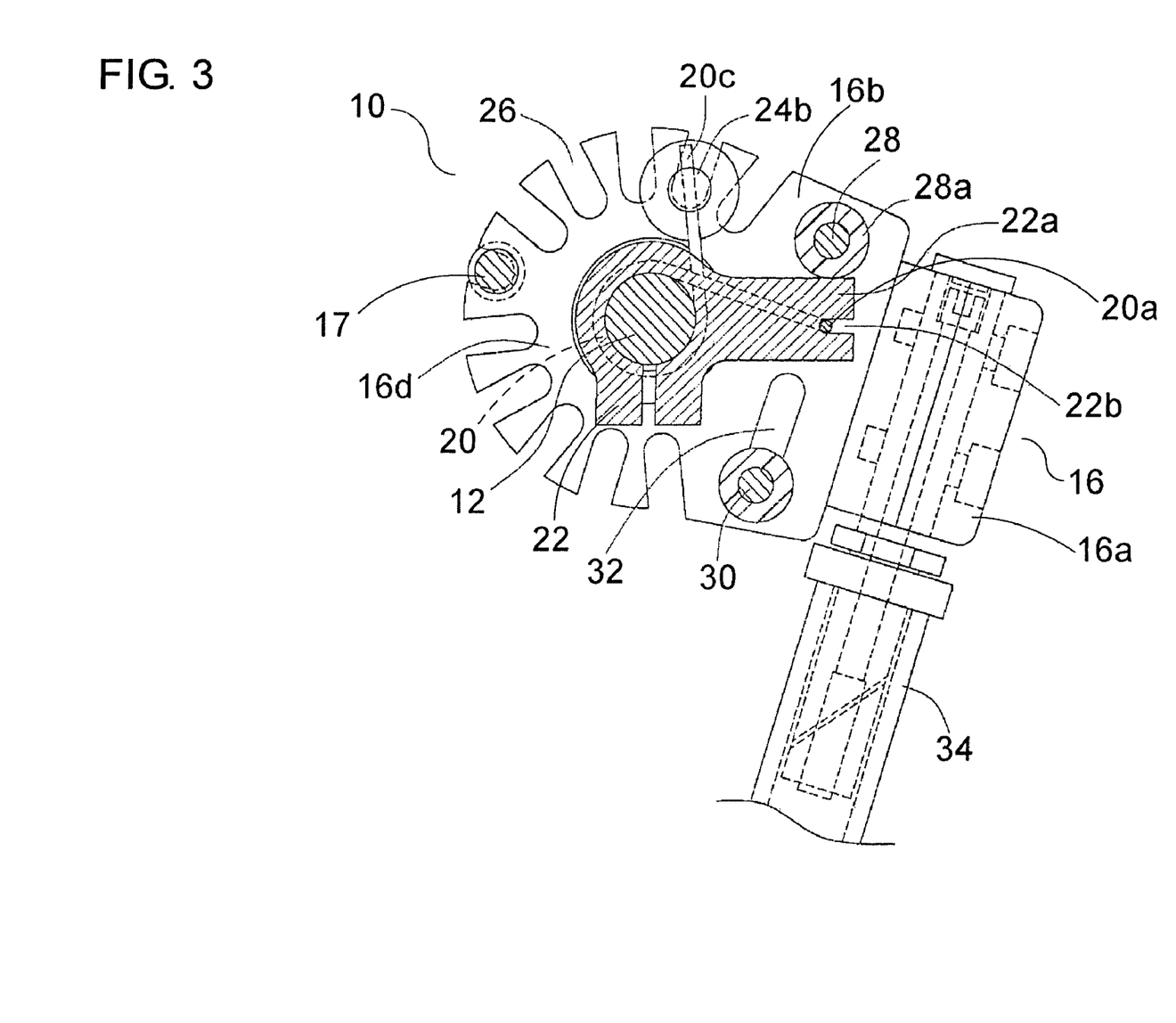
FIG. 3 is a partial sectional view taken along line 3—3 in FIG. 2.

FIG. 3 shows, in a sectional view, handlebar bracket 16 installed onto a standard bicycle handlebar stem 34. Handlebar 12 is at its resting position with end 22a of torsional bracket 22 at rest against top limiting bolt sleeve 28a.

FIG. 4 shows in a sectional view, handlebar bracket 16 and shows a position of handlebar 12 at resting position with torsional bracket 22 at rest against top limiting bolt sleeve 28a.

FIG. 5 shows in a sectional view of handlebar bracket 16 and shows the position of handlebar 12 at torsional extension position with torsional bracket 22 at rest against bottom limiting bolt sleeve 30a.

FIG. 6 shows that limiting bolt 30 and sleeve 30a having been repositioned along the adjustment slot 32 of the side plates 16c and 16d to adjust the rotation range of handlebar 12.

Figure 7A:
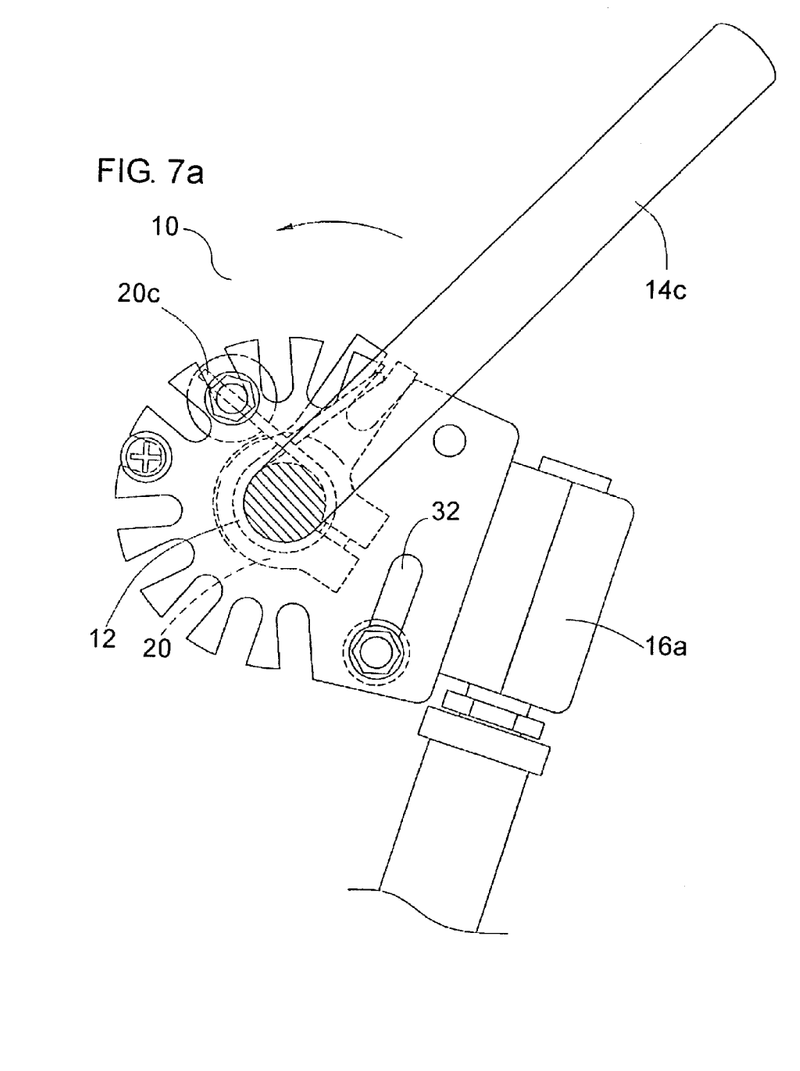
FIG. 7a is the sectional view of FIG. 4 showing adjustment of the spring stiffness.
Figure 7B:
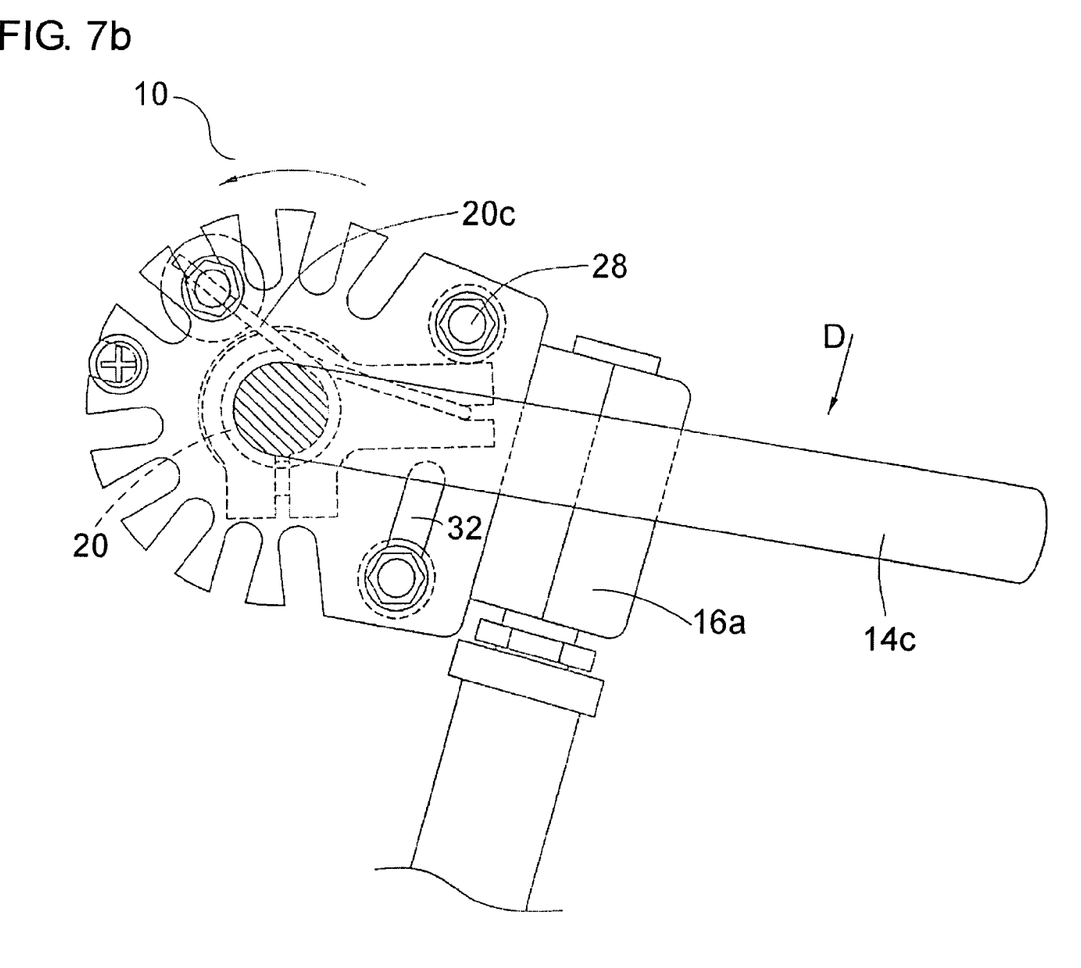
FIG. 7b is the sectional view of FIG. 7a showing the completed adjustment to increase the spring stiffness and with the upper limiting bolt re-installed.

FIG. 7a shows how tension adjustment of spring 20 is made where top limiting bolt 20 is removed, handlebar 12 is rotated upward to loosen spring 20 for relocation of spring positioning bolts 24a and 24b as shown completed in FIG. 7b.

Figure 8:
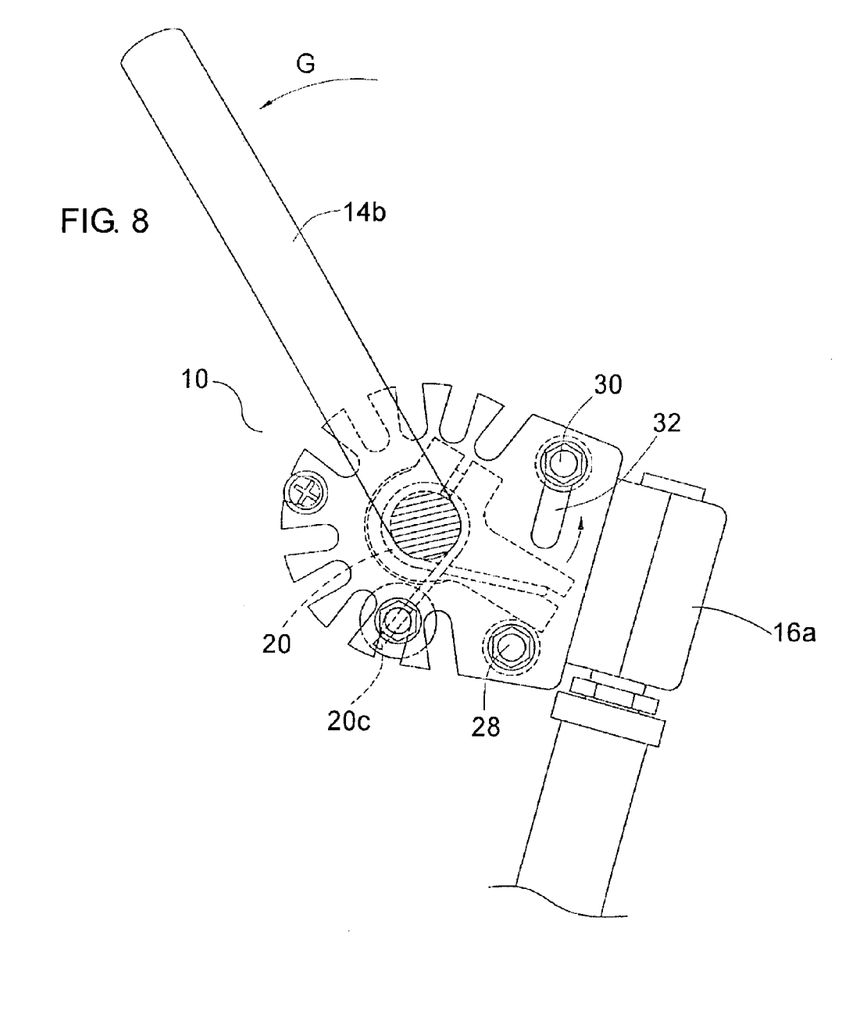
FIG. 8 is a sectional view showing an inverted installation of the handlebar bracket for use with forward-tilting handlebar grips.

FIG. 8 shows the handlebar grips 14a and 14b mounted so as to tilt forward. In this embodiment, the handlebar mounting bracket 16 is inverted so that limiting bolt 30 still is adjustable for the downward rotational range of the handlebars as they are rotated in direction G.

Figure 9:
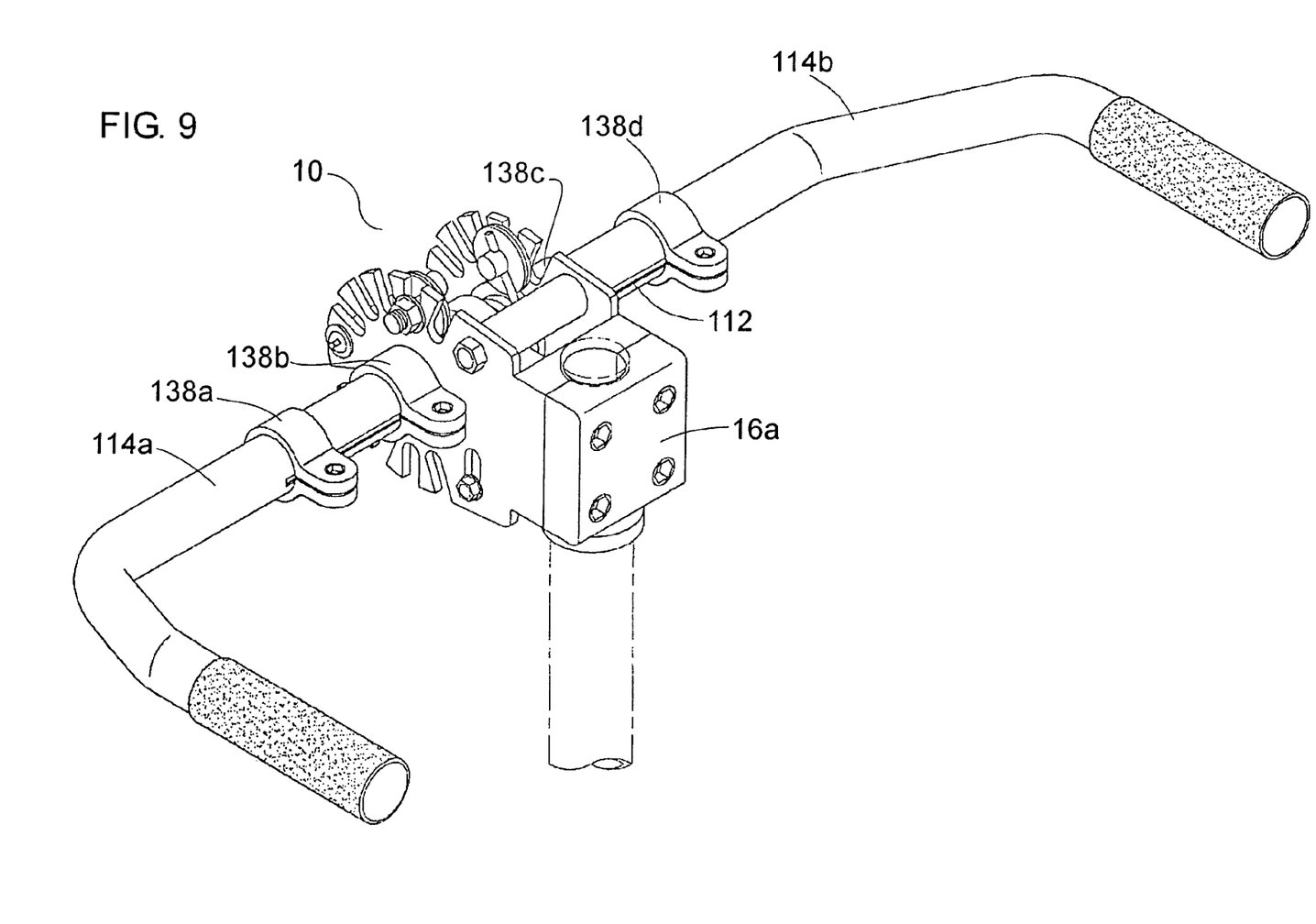
FIG. 9 is a perspective view showing an alternate type of handlebar grip.
Figure 10:
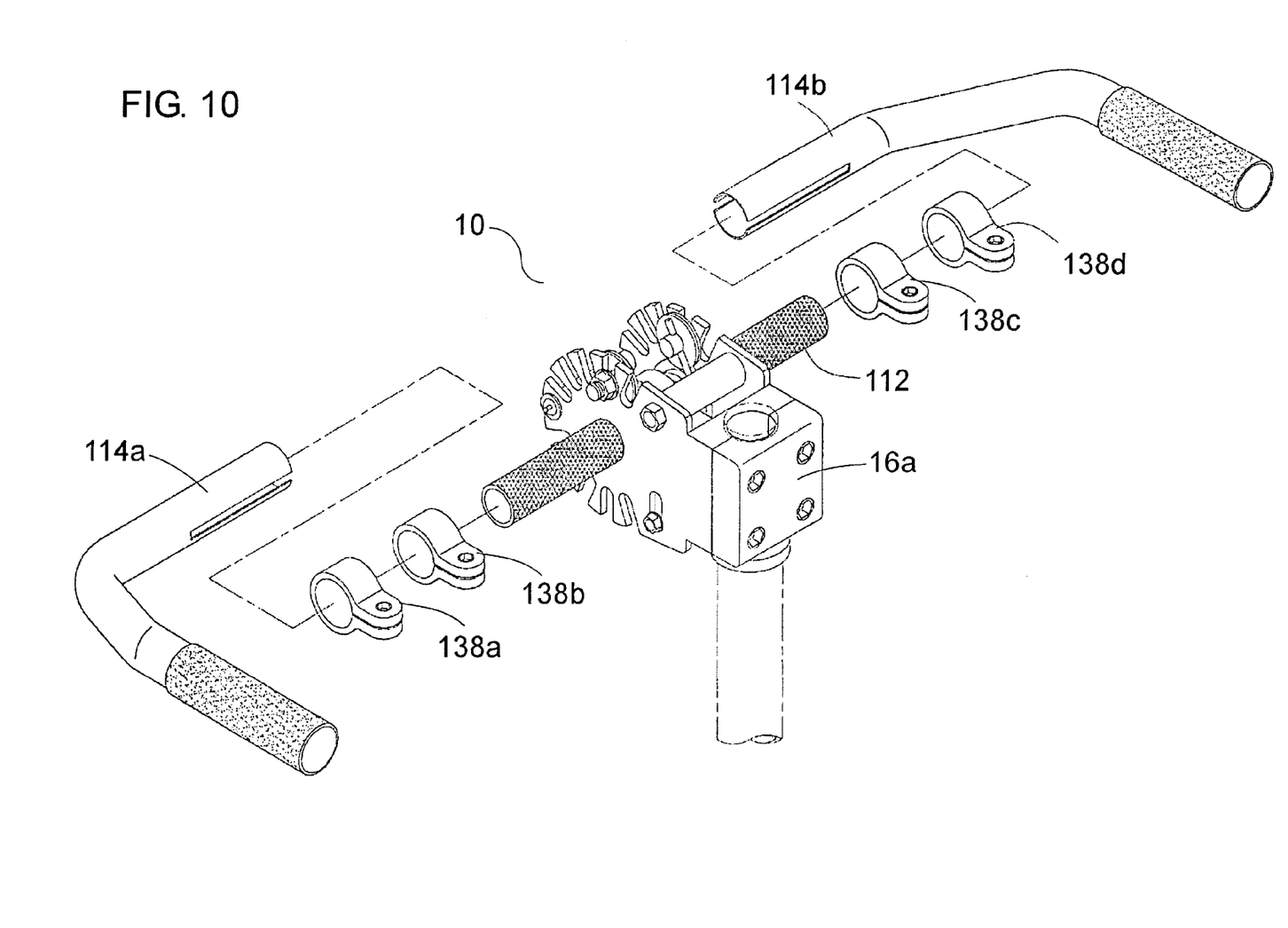
FIG. 10 is an exploded perspective view showing each component of the alternate of FIG. 9.

FIG. 9 & FIG. 10 show in perspective view and exploded perspective view, an alternate type of handlebar 112, with handlebar grips 114a and 114b. Handlebar grips 114a and 114b include handlebar grip clamps 138a, 138b, 138c and 138d.

Figure 11:
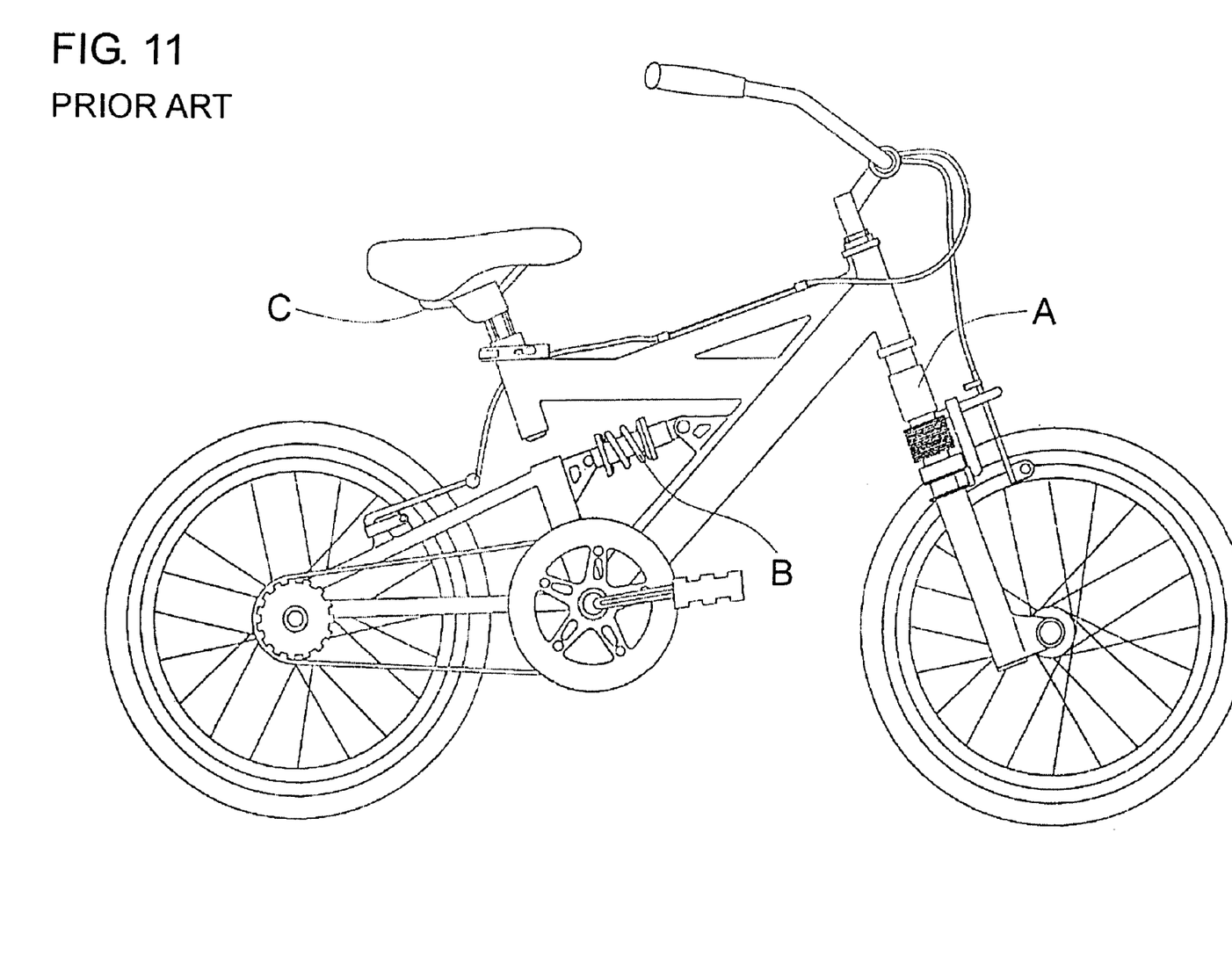
FIG. 11 is a side view of a traditional bicycle with various different shock-absorbing means built into a bicycle frame.

Prior art bicycle shock-absorbers are illustrated in FIG. 11. These include springs and/or liquid type shock-absorbers within the front steering fork "A", under the seat "B" and under the top bike frame tube "C". It is understood that the present invention is not necessarily restricted to use with linear handlebars, bars having bull-horn style handlebar grips 14a and 14b, or grips 114a and 114b, but may also be employed with other, for example curved styles of handlebars such as, for example, the cruiser-style handlebars illustrated in FIG. 11.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A handlebar shock absorbing device for bicycles, comprising: a handlebar set, a mounting bracket set and a torsion spring; said handlebar set comprising a handlebar rotatably mounted to the bicycle, a pair of handlebar grips mounted at certain angles on two ends of said handlebar to form a lever arm, a torsion bracket having a cantilever end with a slot mounted on the center of said handlebar; said handlebar mounting bracket set comprising a mounting bracket installed to a bicycle handlebar stem, and having two opposing side plates extending from a base of said mounting bracket, with one opposing central hole in each of two opposing side plates for said handlebar to pass through; said torsion spring being a double helical torsion spring comprising a U-shaped middle portion and two free ends, wherein said U-shaped middle portion engages said slot of the cantilever end and each of said two free ends is fixed to each of opposing positioning slots radially spaced apart from the central hole of two said side plates, with each positioning slots opening outwardly of said mounting bracket.

2. A handlebar shock absorbing device of claim 1, wherein said handlebar rotatably passes through said central hole of said two opposing side plates, rotates co-axially about the handlebar axis with the downward pushing force of said handlebar grips and rotates against said torsion spring.

3. A handlebar shock absorbing device of claim 1, further comprising adjustment slots formed on said opposing side plates and a lower limiting bolt, within said adjustment slots adjust a rotation range of said handlebar grips.

4. A handlebar shock absorbing device of claim 1, further comprising positioning bolts fixed to said two free ends of said torsion spring, bolts in different pairs of said opposing positioning slots adjust a spring tension of said torsion spring.

5. A handlebar shock absorbing device of claim 4, wherein the adjustment of said spring tension of said torsion spring is done when said torsion spring is under a non spring load condition.

6. A handlebar shock absorbing device of claim 1, wherein said mounting bracket is configured to be mounted on the bicycle stem forwardly or rearwardly vertically inverted to allow either backward or forward tilting of said handlebar grips.

* * * * *